UNITED STATES PATENT OFFICE.

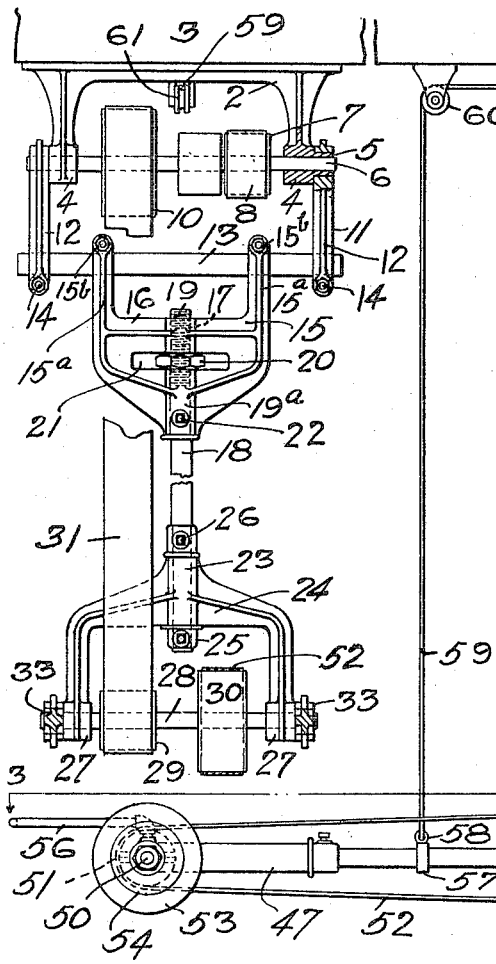

CHARLES G. SMITH, OF ASPINWALL, PENNSYLVANIA.

GRINDING-MACHINE.

971,697. Specification of Letters Patent. Patented Oct. 4, 1910.

Application filed September 2, 1909. Serial No. 515,927.

*To all whom it may concern:*

Be it known that I, CHARLES G. SMITH, a resident of Aspinwall, in the county of Allegheny and State of Pennsylvania, have invented a new and useful Improvement in Grinding-Machines; and I do hereby declare the following to be a full, clear, and exact description thereof.

My invention relates to grinding machines, its object being to provide a machine of this character which may be used for heavy work, such as the grinding of irregularities from large castings with great rapidity.

A further object of the invention is to so support and unite the parts as to form a very rigid, durable structure.

To these ends my invention comprises the novel features hereinafter set forth and claimed.

In the drawing Figure 1 is a side view of my improved machine; Fig. 2 is a section in the line (2—2) Fig. 1; Fig. 3 is a plan view; Fig. 4 is an enlarged section on the line (4—4), Fig. 1.

In the drawings the numeral 2 designates a suitable shaft-hanger or bracket secured to the overhead structure 3. The shaft-hanger 2 has the bearings 4 and formed integral with said bearings are the hub-portions 5. The shaft 6 is supported in the bearings 4 and secured to said shaft is the driving pulley 7 which is connected up by a belt 8 to a suitable engine or motor. In addition to the pulley 7 is the pulley 10.

Suspended from the hanger 2 is the swinging frame 11, said frame being suspended from the hanger 2 by engaging the hubs 5 thereof. In this manner the swinging frame 11 and the parts carried therefrom are supported directly from the hanger instead of from the shaft 6. This relieves the shaft 6 from the weight and strain of said frame and provides a strong durable construction. The arms 12 of the swinging frame are split at their lower ends to receive the cross bar 13 and said cross bar 13 is held securely in place by the bolts 14 passing through the divided ends of the arms 12. In this manner the bar is clamped between the split ends of the arms 12 and by loosening the bolts 14 the bar 4 may be shifted from one side to the other to bring the pulleys into alinement, as hereinafter set forth.

Forming part of the swinging frame is the yoke 15 which is supported from the cross-bar 13, said yoke having the cross-member 16 with the threaded opening 17 formed therein. The arms 15ᵃ of the yoke 15 have split ends like the arms 12 and bolts 15ᵇ clamp said arms securely to the cross-bar 13. The yoke 15 may be moved along the bar 13 when the bolts 15ᵇ are loosened to bring the pulleys into alinement, as hereinafter set forth. The bar 18 is threaded at its upper end and said bar is adapted to engage the opening 17. Said bar also passes through the sleeve portion 19ᵃ of the yoke 15. A nut 20 engages the threaded portion of the bar 18 and said nut is adapted to rotate in the slot 21 formed in the yoke 15.

From the above construction it will be apparent that the bar 18 may be moved up and down by turning the nut 21. A set screw 22 passing through the sleeve portion 19 is adapted to secure the bar 18 in position against rotation. The lower end of the bar 18 passes down through a sleeve portion 23 of a yoke 24 and at the lower end of the sleeve 23 is the collar 25. A set screw or pin 26 secures the bar 18 within the upper end of the sleeve portion 23 of the yoke 24.

The yoke 24 is provided with the bearings 27 to form journals for the shaft 28. This shaft 28 carries the pulleys 29 and 30. A belt 31 connects the pulley 10 with the pulley 29. The bearings 27 of the yoke 24 have the hubs 32 projecting therefrom and mounted on said hubs are the arms 33 of the horizontal frame 34. The arms 33 are split, as at 35, to receive the cross bar 36 and the bolts 37 act to clamp the cross bar 36 securely in place. A yoke 38 is secured by the bolts 39 to the cross bar 36, said bolts passing through the split ends of the arms 38ᵃ, and said yoke is provided with the threaded opening 39 in the cross member 40. A bar 41 is threaded and passes through the opening 39. A nut 42 engages said bar, said nut working in the slot 43. A set screw 44 passes through the sleeve portion 45 of the yoke. The opposite end of the bar 41 passes through the sleeve portion 46 of the yoke 47 and a collar 48 secures said yoke to the outer end of said bar. Journaled in the bearings 49 in the yoke 47 is the shaft 50 and said shaft carries the pulley 51 which is connected up by a belt 52 with the pulley 30 on the shaft 28. On the extreme outer end of the shaft 50 beyond the bar is the emery wheel 53 which is interposed between the washers 54, said wheel being held in place by means of the nut 55. A handle 56 is connected to the bearings of the yoke 47 by means of which the operator brings the grinding wheel in position with reference to the work.

Secured to the bar 41 is the collar 57 with the eye 58 to which the cable 59 is secured, said cable passing through and around the pulley 60 and thence to the pulley 61. A weight 62 is secured to the free end of said cable.

When my improved apparatus is in use and it is desired to grind therewith the casting or other object to be operated on is brought into proper position with reference to the apparatus, when the operator, by grasping the handle 56, forces the wheel 53 into contact with the obstruction to be ground and with the machine operating at a high rate of speed and the wheel held into forced contact with the work the metal is quickly ground away and when the operator releases his hold on the handle 56 the machine, being properly counterbalanced, resumes its normal position. By having the emery wheel 53 located at the outer end of the shaft 50 beyond the bearings, free access is had to the wheel for purposes of removing the same and applying a new one, the operation of changing requiring but a few minutes and only necessitates the removal of the nut 55 and one of the washers 54. This is a matter of great convenience, as in heavy work these emery wheels wear out rapidly and have to be constantly renewed.

By supporting the frame work from the hanger, or the hubs formed integral therewith, I relieve the shafts of the weight of the frames and not only by a more durable construction, but at the same time greatly relieve the strain on said shaft.

In case the bars 18 were to bend for any reason under strain or get out of alinement, the pulleys 10 and 29 would not be in proper alinement and this can be readily corrected by removing the bolts 15$^b$ and shifting the yoke 15 one way or another in order to bring the pulleys into proper alinement. The same provision is made for bringing the pulleys 30 and 51 into proper alinement. Any slack in the belts 31 and 52 may be readily taken up by the adjustment of the nuts 21 and 43 by turning which the bars 18 and 41 may be moved longitudinally to increase the distance between the yokes and so take up any slack in the belts.

What I claim is:

1. In a grinding machine, the combination of a swinging frame, a hanger or support, a shaft on said support and journaled directly therein, driving connections between said shaft and the grinding mechanism, and means for supporting said swinging frame directly from said support.

2. In a grinding machine, the combination of a swinging frame, a hanger or support, a shaft in said support and journaled directly therein, driving connections between said shaft and the grinding mechanism, and hub portions on said hanger from which said swinging-frame hangs.

3. In a grinding machine, the combination of a suitable support, a swinging-frame carried thereby, grinding mechanism carried thereby, a shaft in said support, a pulley on said shaft, a shaft in said swinging frame, a pulley carried thereby in alinement with said first named pulley, and means for moving said swinging frame laterally on said support.

4. In a grinding machine, the combination with a suitable support, of a swinging-frame, grinding mechanism carried thereby, a shaft journaled in said support, a shaft in said swinging frame, pulleys on said shafts in alinement with each other, a cross-bar on said swinging-frame, a laterally movable section of said swinging frame supported by said cross-bar, and means for securing said laterally movable section to said cross-bar.

5. In grinding apparatus, the combination of a suitable support, a shaft journaled therein, a swinging-frame carried by said support, grinding mechanism, a shaft in said swinging-frame, pulleys on said shaft, a belt connecting said pulleys, said swinging frame formed of two parts, a threaded bar on one part engaging a threaded seat on another, and an adjusting nut on said bar.

In testimony whereof, I the said CHARLES G. SMITH have hereunto set my hand.

CHARLES G. SMITH.

Witnesses:
LILLIAN C. KOCH,
A. G. KATZ.